United States Patent [19]

Lambourn

[11] Patent Number: 4,757,636
[45] Date of Patent: Jul. 19, 1988

[54] INSULATED AERATED LIVE BAIT BUCKET

[76] Inventor: Robert G. Lambourn, 3412 W. Fairway Dr., McHenry, Ill. 60050

[21] Appl. No.: 112,740

[22] Filed: Oct. 22, 1987

[51] Int. Cl.$^4$ .............................................. A01K 97/04
[52] U.S. Cl. ........................................................ 43/57
[58] Field of Search ............................ 43/57, 55, 56; 261/121.2

[56] References Cited

U.S. PATENT DOCUMENTS

| | | | |
|---|---|---|---|
| 3,129,692 | 4/1964 | Sanderson | 43/55 |
| 3,323,249 | 6/1967 | Randall | 43/57 |
| 3,958,359 | 5/1976 | Doughty | 43/55 |
| 4,255,360 | 3/1981 | Jeffries | 43/121.2 |
| 4,462,180 | 7/1984 | Scott | 261/121.2 |
| 4,615,137 | 10/1986 | Radmanovich | 261/121.2 |
| 4,677,785 | 7/1987 | Lambourn | 43/55 |

Primary Examiner—Gene P. Crosby
Attorney, Agent, or Firm—Haight & Hofeldt

[57] ABSTRACT

An insulated aerated live bait bucket is disclosed comprising a container for water formed from a bottom wall and a side wall with a bottom wall having an aperture therein for the admission of air into the water, an insulated liner which fits within the side wall and atop the bottom wall of the container with an opening therein which is in alignment with the aperture and the bottom wall of the container and the structure for removably holding the liner within the container. In one embodiment the holding structure is formed from a plurality of hooked clips. In another embodiment the holding structure is formed from a skirted washer. In addition an improved arrangement of the aeration system is disclosed.

20 Claims, 5 Drawing Sheets

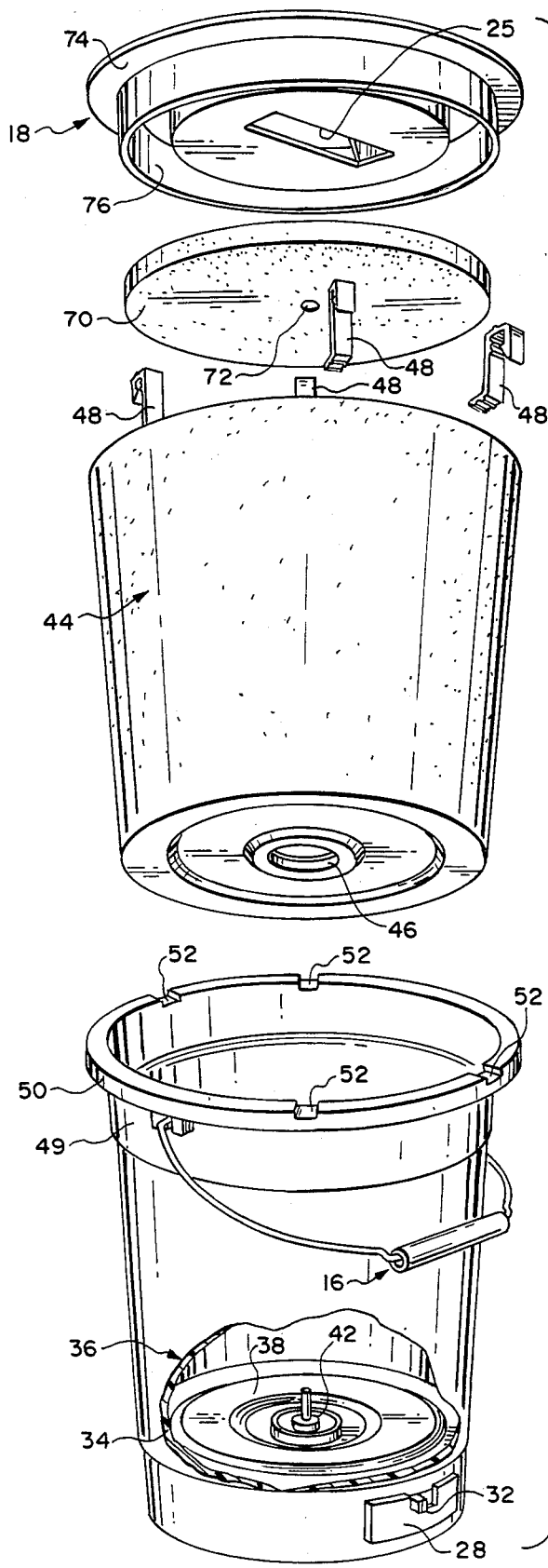
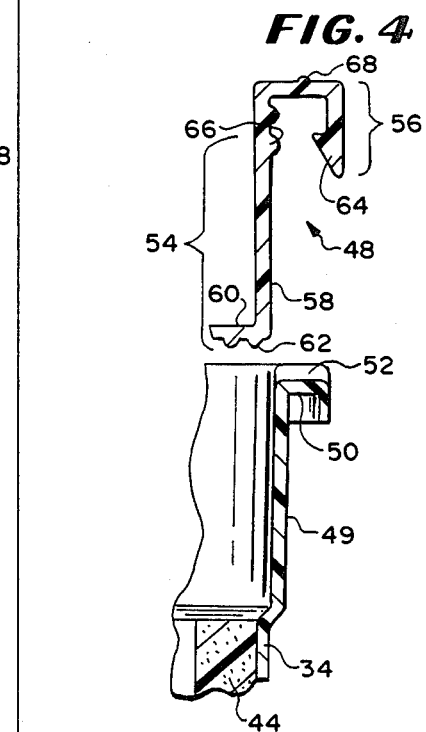
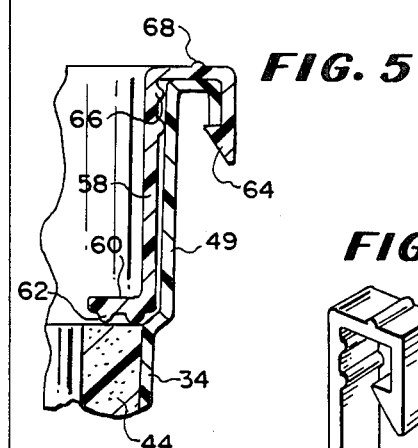
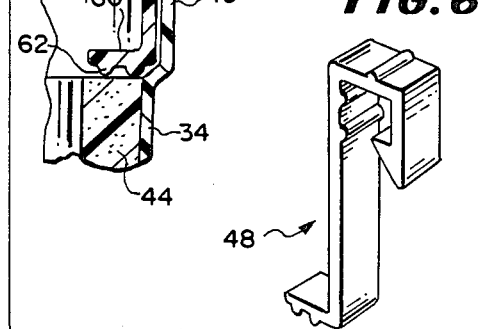

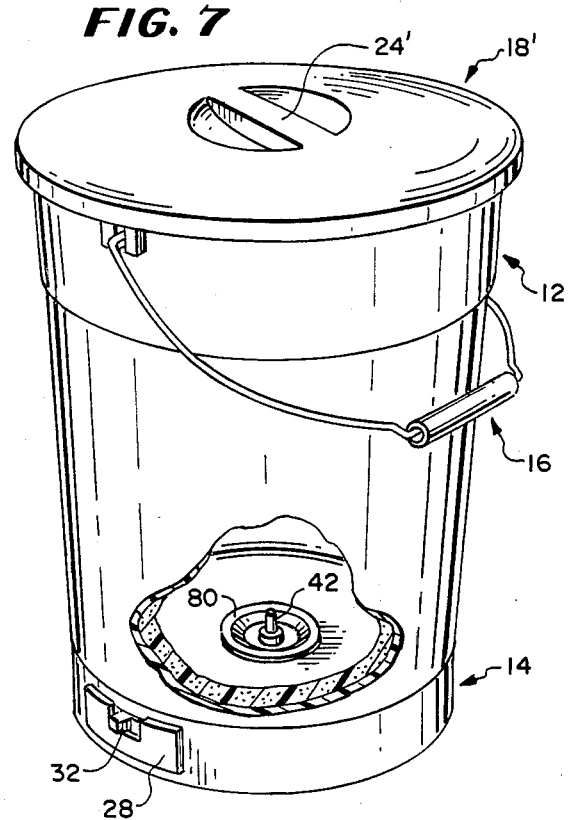
FIG. 7
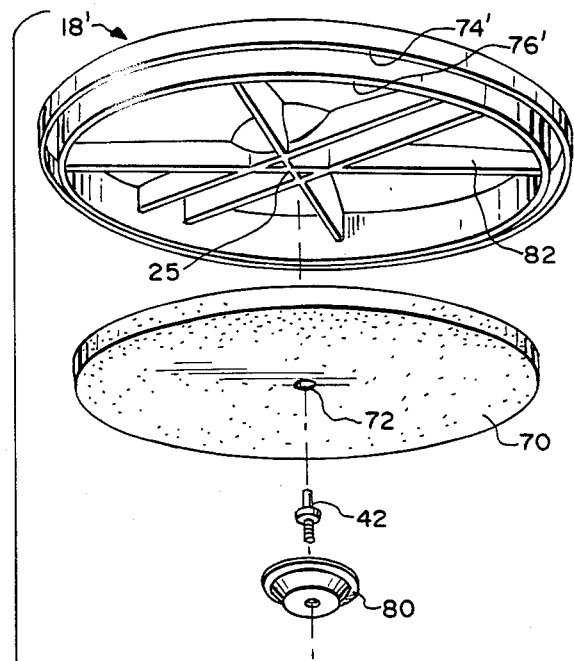
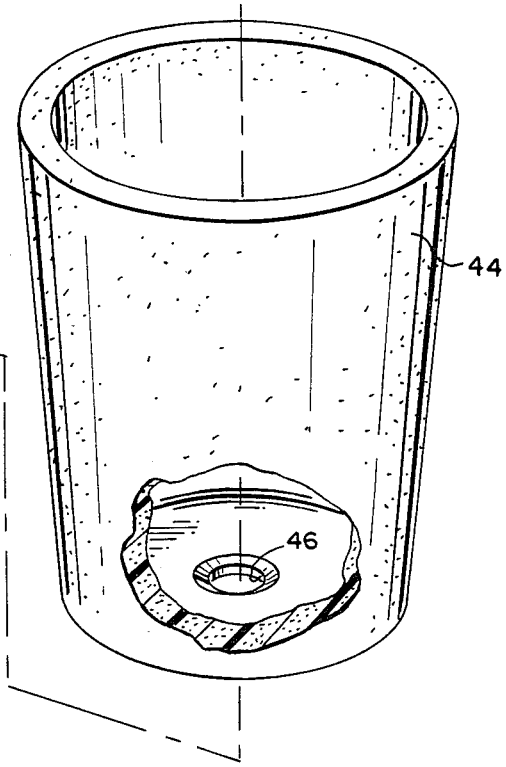
FIG. 8
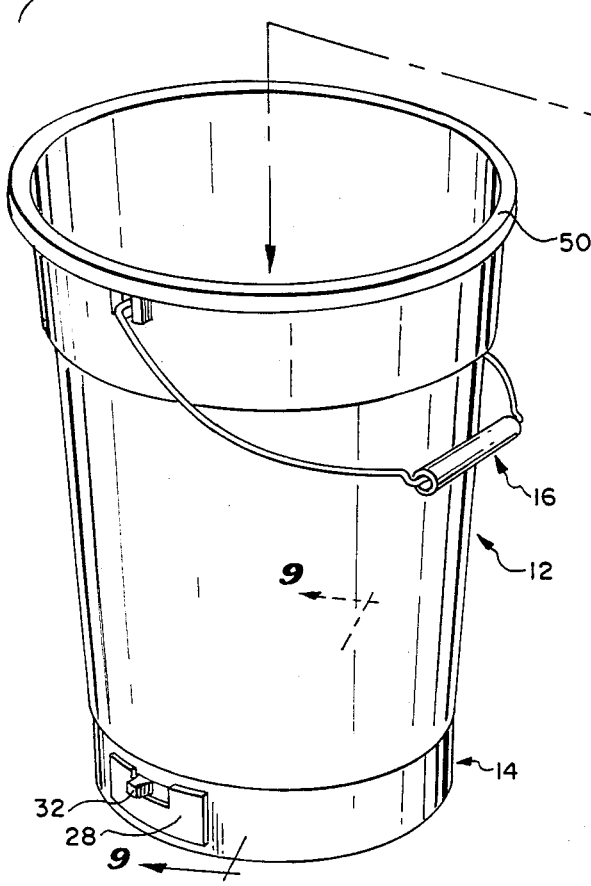

INSULATED AERATED LIVE BAIT BUCKET

TECHNICAL FIELD

This invention relates to live bait buckets in general and, more particularly, to bait buckets provided with an aeration means for increasing the oxygen content of the water in the bucket so as to prolong the life of the bait kept in the bucket.

BACKGROUND OF THE INVENTION

U.S. Pat. No. 4,677,785 describes the details of an improved aerated live bait bucket. Specifically, that patent describes a self-contained aerated live bait bucket which is economical to construct and operate, which is convenient to use, and which eliminates the possibility of water leakage through the aeration system, even though air is introduced at the bottom of the bucket.

Those skilled in the art know that unless the water in a bait bucket is changed as the oxygen content drops, the live bait will not survive. It also has been found that if the water in the bucket is kept cool, the bait, such as minnows, can be kept alive and fresh for an extended period of time. For example, U.S. Pat. No. 3,323,249 describes an aerated live bait bucket which has an aeration pump carried by the cover of the bucket and a bucket which is insulated with a closed cell plastic foam material, such as foam polyethylene, foam polypropylene, or the like. The lining keeps the water in the container cool by insulating it from the surrounding air. Since no details are provided as to the manner in which the insulation is applied to the walls of the bucket, one can only speculate as to what prevents it from floating free from the walls of the bucket in the event that water leaks through.

Certainly, the art does not teach how insulation may be applied to a bucket of the type wherein air is introduced at the bottom of the bucket. Moreover, since it is very desirable to keep the interior of the bucket clean, a removable insulated liner is highly desirable. The art does not teach or suggest how such a removable liner can be used in conjunction with an aeration system where air is introduced at the bottom of the bucket and how such a liner can be easily and quickly removed while at the same time remaining firmly in place when the bucket is in use. Clearly, there still remains a need to improve the design and construction of aerated bait buckets.

SUMMARY OF THE INVENTION

In accordance with the present invention, a live bait bucket is described comprising: a container for water formed from a bottom wall and a side wall with the bottom wall having an aperture therein for the emission of air into the interior of the container; an insulated liner which fits within the interior of the container and which has an opening which is aligned with the aperture in the container; and holding means for removably holding the liner within the container.

More specifically, in one embodiment, the holding means is formed from a plurality of clips which are removably carried by the lip of the container. In another embodiment an aeration means is provided which is carried by the bottom wall of the container and which includes means for sealaing the opening in the bottom wall; in that embodiment the holding means is a skirted washer which is carried by aeration system.

In each embodiment, the aeration system comprises: a base carried by the bottom wall at the exterior of the container; an electrically driven air pump which is carried by the base for pumping air from the exterior of the container to the interior of the container through the aperature in the bottom wall and the opening in the liner; and a power supply for the pump which comprises one dry cell which is removably carried within a drawer which is slidingly carried by the base.

From the foregoing it should be clear that there has been provided an improved aerated live bait bucket which features an insulated liner which can be quickly and easily installed and removed from the bait bucket, and a more efficiently arranged aeration system. Numerous other advantages and features of the present invention will become readily apparent in the detailed description of the invention, the embodiments presented, the accompanying drawings and the claims which follow.

BRIEF DESCRIPTION OF THE DRAWINGS

FIG. 3 is an exploded perspective view, with a portion of the container broken away, of the aerated bait bucket of FIG. 1 illustrating the manner in which various components are assembled;

FIG. 4 is a partial, cross-sectional, side, elevational view of a clip which is used to hold the insulated liner within the container of FIG. 1, with the clip removed from the lip of the container;

FIG. 5 is a partial, cross-sectional, side elevational view of the clip of FIG. 4 with the clip inserted on the lip of the container and atop the liner, as viewed along line 5—5 of FIG. 1;

FIG. 6 is a perspective view of the clip of FIGS. 4 and 5;

FIG. 7 is a perspective view, with a portion broken away, of another embodiment of the aerated insulated live bait bucket constructed in accordance with the principles of the present invention;

FIG. 8 is an exploded perspective view, with a portion of the liner broken away, of the aerated bait bucket of FIG. 7, illustrating the manner in which the various components are assembled;

DESCRIPTION OF THE PREFERRED EMBODIMENTS

Figure 1:
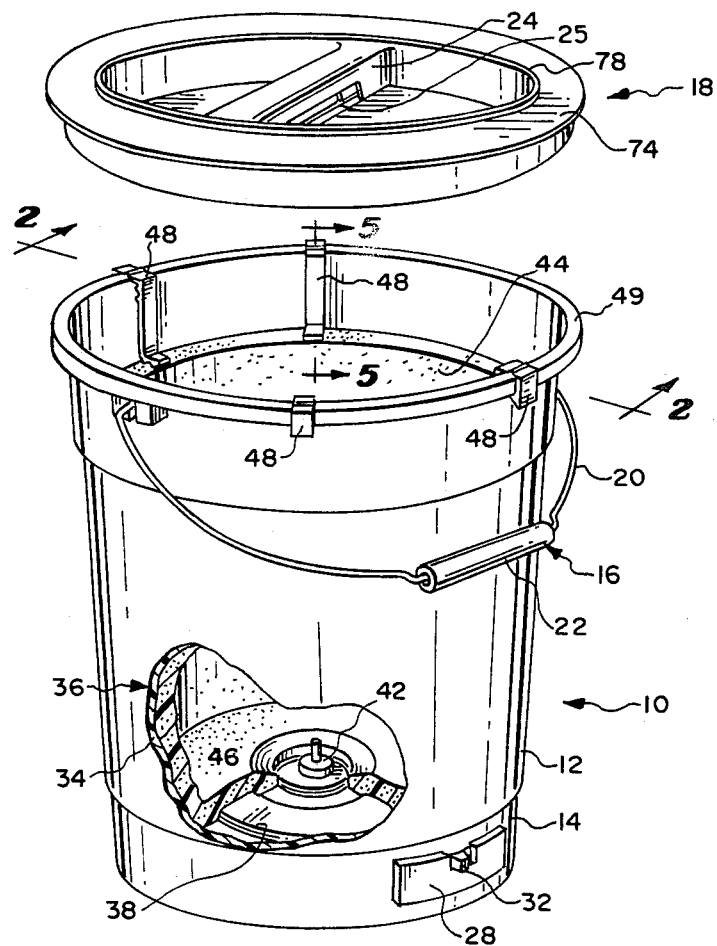
FIG. 1 is a perspective view, with a portion broken away, of one embodiment of an aerated insulated live bait bucket constructed in accordance with the principles of the present invention.

While this invention is susceptible of embodiment in many different forms, there is shown in the drawings and will herein be described in detail several preferred embodiments of the invention. It should be understood, however, that the present disclosure is to be considered an exemplification of the principles of the invention and is not intended to limit the invention to the specific embodiments illustrated.

Referring to FIG. 1 of the drawings, one embodiment of an aerated, insulated, live bait bucket 10 is illustrated. Specifically, that bucket comprises a container 12, a base extension 14, a handle 16 and a lid or cover 18. In a typical manner, the bucket handle 16 is formed of wire 20 with an enlarged grip member 22. The lid 18 is provided with a handle 24 for ease of removal of the lid from the container 12. An opening 25 is formed in the lid 18 under the handle 24 for the purpose of permitting air to escape from the interior of the container 12. The base extension 14 houses the aerator mechanism functionally similar to the appratus disclosed in U.S. Pat. No. 4,677,785 which teachings are hereby incorporated by reference. The base extension 14 is provided with an aperture 26 (see FIG. 12) in which is secured a drawer 28. The drawer carries an electrical battery or dry cell 29 and the switch 32. A portion of the side wall 34 of the container 12 is broken away at 36 to reveal the bottom wall 38 of the container, which is located at the top of the base extension 14. An aperture 40 (see FIG. 12) is provided at the center of the bottom wall 38 for the purpose of providing a way of introducing air into the interior of the container 12 by means of a fitting 42. An insulating liner 44 is carried at the interior of the container 12. The liner 44 is formed from a foam insulating material which fits within the side wall 34 of the container 12 and the top of the bottom wall 38 of the container. According to the orientation of FIG. 1, the liner has an open top and a bottom end which is provided with an opening 46 (see FIG. 3) which is aligned with the aperature 40 in the bottom wall 38 of the container 12 and the fitting 42.

The liner 44 is held within the container 12 by a plurality of clips 48. More specifically, the upper end or top 49 of the side walls 34 of the container 12 is formed into a flanged lip 50 having a generally U-shaped cross section (see FIG. 4). The clips 48 are removably carried by the lip 50 to hold down the liner 44 within the container 12. Channels 52 (see FIG. 3) are provided at the upper edge of the lip to facilitate insertion of the clips 48 and to insure that the clips are evenly spaced apart on the top 49 of the container 12.

Turning to FIG. 4, each clip 48 comprises a spacer portion 54 and a hook-like fastener 56. The spacer portion 54 is disposed (See FIG. 2) between the cover 18 and the interior of the top end 49 of the container for holding the top end of the liner at a spaced distance below the top end or lip 50 of the container. The hooked fastener 56 is connected at one end to the spacer portion 54 and serves to removably connect the spacer portion 54 to the lip 50. More specifically, the spacer portion 54 comprises a generally elongated element 58 which has two opposite ends with one of the ends joined to the hooked fastener 56, and the other end joined to a generally flat element 60, so as to have a generally L-shaped cross section. The flat element 60 is preferably formed to have a plurality of teeth 62 to dig into the top end of the liner 44 when clip 48 and liner are installed in the container 12 (see FIG. 5). The hooked end or fastener portion 56 of the clip 48 is provided with a barb 64 to hold the clip snugly against the edge of the lip 50. The end of the elongated element 58, which is connected to the hooked fastener 56, is provided with a plurality of teeth or a thickened portion 66 to act as a fulcrum when the barb 64 is clipped about the lip 50. Another thickened portion 68 insures that when the lid 18 is placed atop the lip 50 of the container 12 there is a small gap, thereby assuring that the lid can be easily removed.

Figure 2:
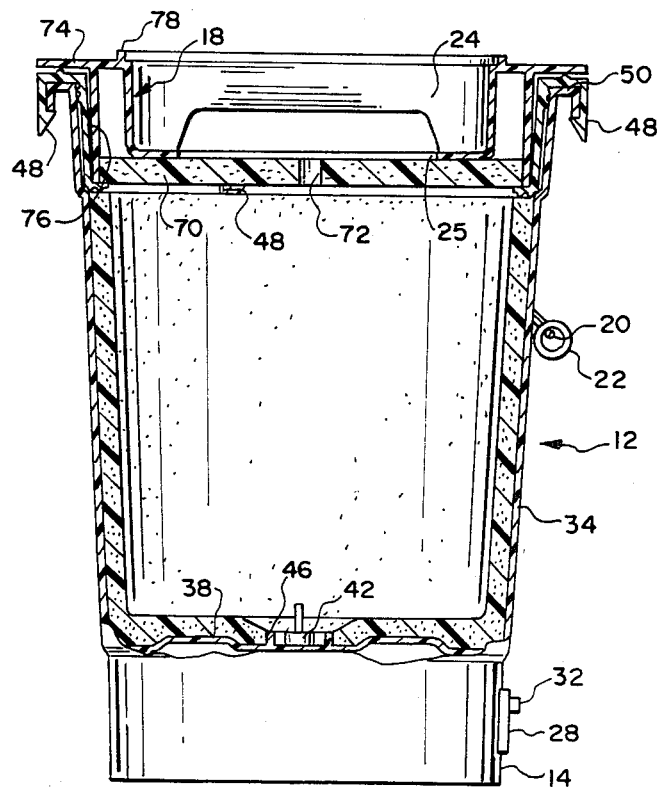
FIG. 2 is a cross-sectional, side, elevation view of the bucket shown in FIG. 1 as viewed along line 2—2.

The cover or lid 18 also carries an insulated member 70 (See FIG. 3). This insulated member 70 insulates the open end or the top end of the container 12. The insulated member 70 is provided with an aperture 72 which is in flow communication with the aperture 25 in the lid 18 (see FIG. 2). As is best illustrated in FIGS. 2 and 3, the cover or lid 18 defines an outwardly facing flanged edge 74, which fits atop the clips 48 and lip 50 of the container 12, and a downwardly facing flanged member 76, which fits along the interior of the clips and adjacent the elongated element 58 of each clip. The depth or length of the flanged member 76 is generally equal to the length of the elongated portion 58 of the spacer portion 54 of the clip 48. Thus, the interior surface of the insulated member 70 will be in close proximity of the top edge of liner 44, thereby virtually insuring that the interior of the container 12 is completely insulated. Finally, it should be noted that the lid or cover 18 defines a generally cricular outwardly extending ridge 78 to facilitate nesting or stacking of two bait buckets.

The second embodiment of the invention is illustrated in FIG. 7. This embodiment is generally similar to the embodiment shown in FIG. 1 with the exception that is has a different cover or lid 18' and a different means 80 to hold the insulated liner within the container 12.

Turning now to FIG. 8, the lid 18' has a lower surface with two downwardly facing circular flanges 74' and 76' so as to define an edge which has a generally U-shaped cross section and which is complimentary to the lip 50 on the container 12. As before, the insulated member 70 of the cover is carried at the interior of the lower surface of the cover 18'. The exterior surface of the cover 18' defines an integral handle or grip 24' and the interior of the lid defines a plurality of generally rectangular ribs 82 which hold the insulated member 70 at the proper distance from the top of the cover and which add strength to the cover.

Figure 9:
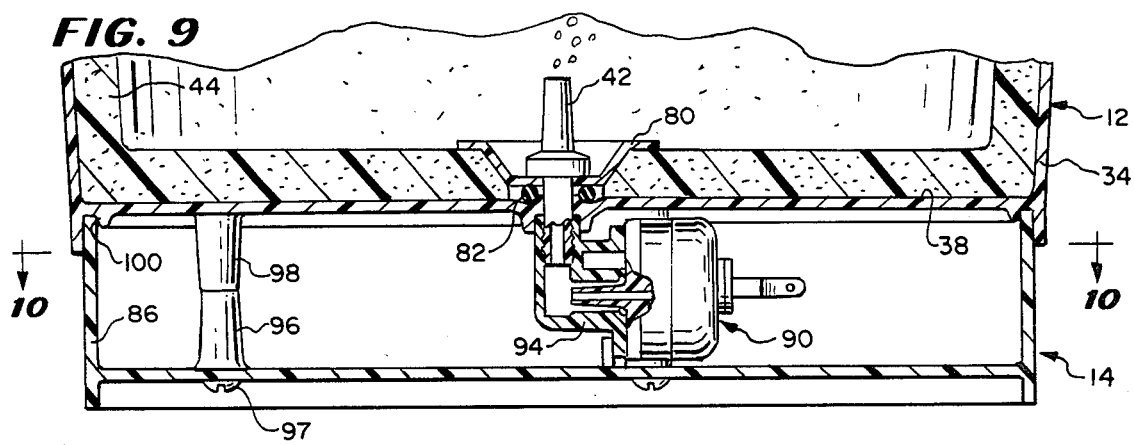
FIG. 9 is a partial, cross-sectional, side view of the bucket of FIG. 8 as viewed along line 9—9.
Figure 10:
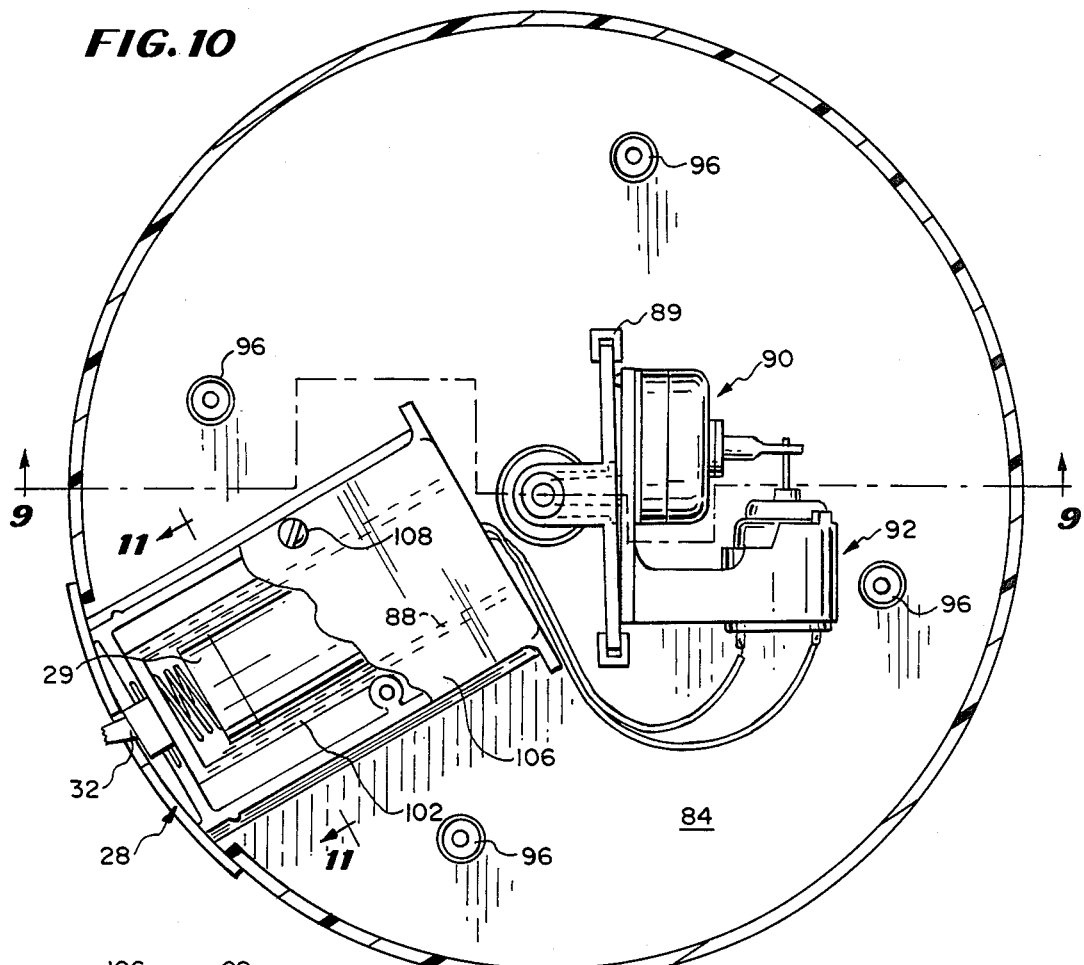
FIG. 10 is a cross-sectional plan view of the bucket of FIG. 9 as viewed along line 10—10.
Figure 11:
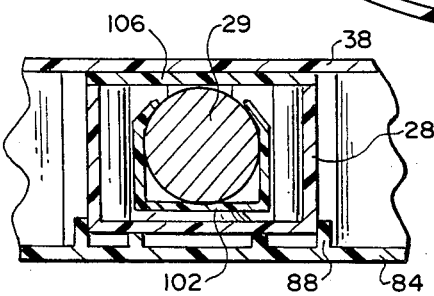
FIG. 11 is a partial, cross-sectional, elevational view of the power supply of FIG. 10 as viewed along line 11—11.

As described in U.S. Pat. No. 4,677,785, a fitting 42, preferably comprised of a nozzle and check valve, allows air to enter the interior of the container 12 from the aeration mechanism or system carried in the base extension 14 (see FIG. 9). To hold the liner 44 in the container 12, a skirted washer 80 is located between a downwardly facing shoulder on the body of the fitting 42 and an O-ring or other type of sealing gasket 83. The O-ring 83 is placed over the threaded base of the fitting 42, such that as the fitting is threaded in place, the O-ring is compressed between the washer 80 and the interior of the bottom wall 38 surrounding the aperture 40. One advantage of this method of holding the liner 44 within the container 12 is that it requires less parts and can be installed quite easily during the manufacture. One disadvantage is that it may not necessarily hold the upper end of the liner in close registration with the upper end of the container such that water may more readily enter the interface between the liner and the container.

Figure 12:
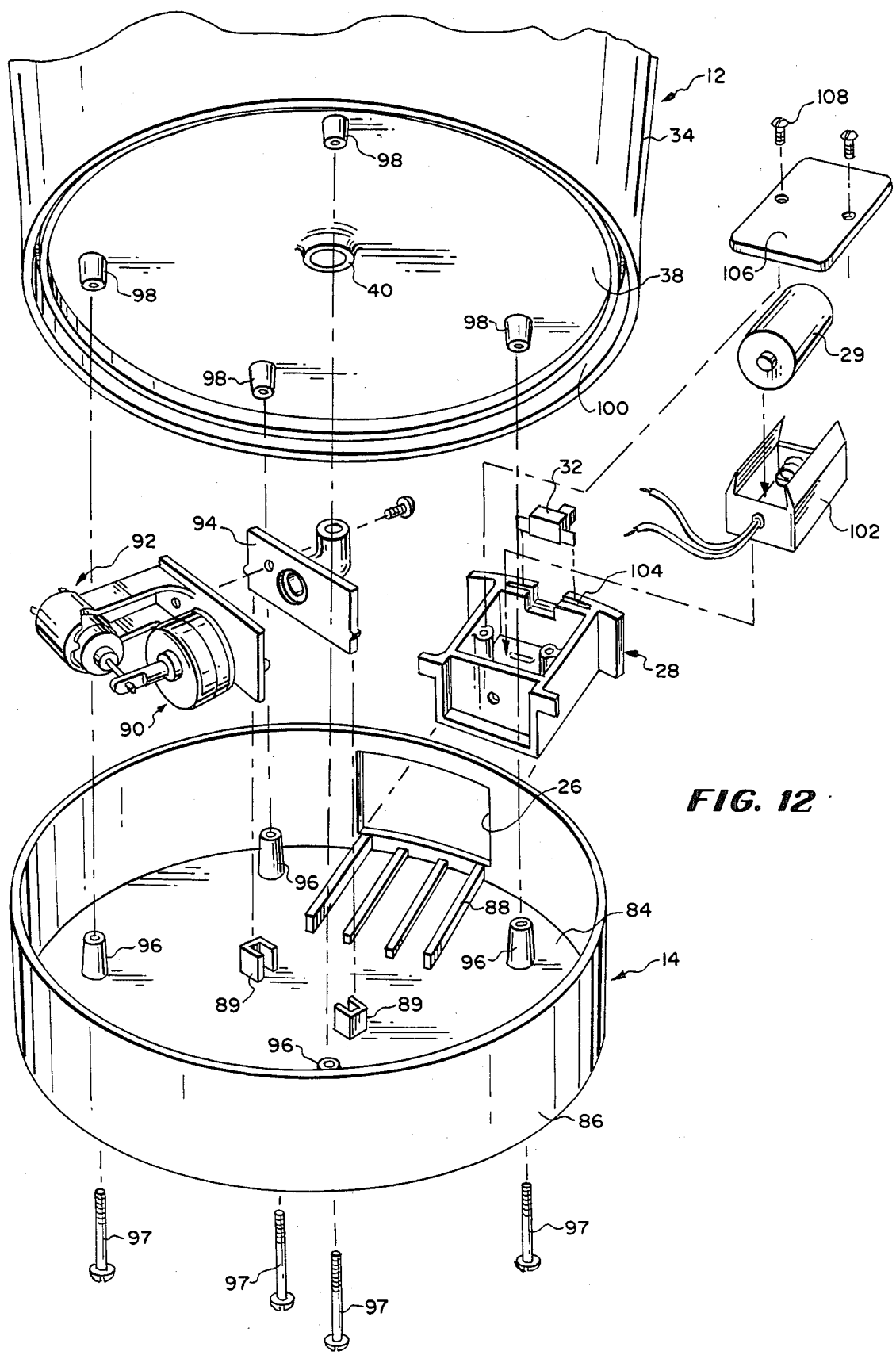
FIG. 12 is an exploded perspective view of the base extension of the live bait bucket of FIGS. 1 and 7.

Turning now to FIG. 12 the interior of the base extension 14 will now be described in detail. The base extension 14 is a generally circular open ended pan comprising a base 84 and a side wall 86. The side wall 86 is provided with an aperture 26 to house the drawer 28. The base 84 has formed therein: guides 88 for the drawer 28; supports 89 for the aeration pump 90, motor 92 and nozzle support 94; and spacers 96. By inserting threaded fasteners 97 through the spacers 96 and into threaded connections 98 on the exterior surface of the bottom wall 38 of the container 12, the base extension 14 can be removably connected to the container. A good firm fit is assured by providing a circular groove 100 which is on the periphery of the bottom wall 38 of the container 12 which is complimentary to the free end or the upper end of the side wall 86 of the base extension 14.

An especially innovative aspect of the aeration system of FIG. 12 is the manner in which the dry cell 29 and switch 32 are carried by the drawer 28. More specifically, a battery holder 102 fits within the four walls of the drawer 28 and the two position switch 32 fits within a recess 104 at the front end of the drawer. The battery holder 102, battery 29 and switch 32 are held within the drawer 28 by a cover or lid 106 which is held on the top of the drawer by removable fasteners 108. Thus, by sliding the drawer 28 from the interior of the base extension 14, one has easy access to the battery. More importantly the battery is protectively housed from the effects of moisture. There is, of course, the benefit of easy assembly.

From the foregoing it will be observed that numerous variations and modifications may be effected without departing from the true spirit and scope of the novel concept of the invention. For example, while a generally circular or cylindrical shape bucket has been illustrated, the teachings of the invention are easily applicable to square shaped and other shaped buckets or containers. Similarly, although circular apertures and openings have been illustrated, other shapes and sizes may be used as well as other locations may be effected. Finally, although a one-piece liner has been shown to fit within the interior of the container, multi-piece liners may be used. Thus, it should be understood that no limitations with respect to the specific embodiments illustrated is intended or inferred. It is, of course, intended to cover by the appended claims all such modifications as fall within the scope of the invention.

I claim:

1. A live bait bucket, comprising:
   (a) a container for water formed with a bottom wall and a side wall, said bototm wall having an aperture therein for the admission of air to said water, said side wall having one end joined to said bottom wall and an opposite end defining the top of said container;
   (b) an insulated liner for said container, said liner fitting within said side wall and on top said bottom wall, said liner having a top end and having a bottom end with an opening therein which is in alignment with said aperture in said bottom wall; and
   (c) holding means, removably carried by said container, for holding said liner within said container.

2. The bucket of claim 1, wherein the top of said container has an outwardly extending lip and wherein the top end of said liner is located at a spaced distance below said lip.

3. The bucket of claim 2, further including:
   (a) a cover for closing the top of said container; and
   (b) an insulated member carried by said cover, for closing the top end of said insulated liner.

4. The bucket of claim 3, wherein said holding means comprises:
   (a) a spacer, disposed between said cover and said side wall, for holding the top of said liner below said lip; and
   (b) hook means, at one end of said spacer, for removably connecting said spacer to said lip.

5. The bucket of claim 4, wherein said spacer comprises:
   (a) a generally elongated element having two opposite ends with one of said ends joined to said hook means, said elongated element being disposed between the periphery of said cover and the interior of said container;
   (b) a flat element, joined to the other end of said elongated element and disposed toward the interior of said bucket and on the top end of said liner.

6. The bucket of claim 1, wherein said bucket comprises:
   (a) a fitting, removably connected to the bottom wall, for aerating the interior of said bucket, said fitting having a portion passing through the aperture in said bottom wall; and
   (b) means, disposed between said fitting and said bottom wall, for sealingly plugging said aperture; and
   wherein said holding means comprises a skirted washer disposed between said fitting and said sealing means.

7. The bucket of claim 1, wherein said bucket comprises:
   aeration means, at the exterior of said bottom wall, for aerating the water contained within said container by pumping air through said aperture.

8. The bucket of claim 7, wherein said aeration means comprises:
   (a) means for pumping air,
   (b) checking valve for directing air flow in the direction of the interior of said container, said check valve being in downstream flow communication with said pumping means;
   (c) a nozzle, in downstream flow communication with said check valve, for directing aerated flow to the interior of said container, at least one of said nozzle and said chcek valve having a body with a shoulder disposed towards the interior surface of said bottom wall; and
   (d) sealing means, disposed between said shoulder and said bottom wall for sealingly plugging said aperture; and
   wherein said holding means comprises a washer disposed between said shoulder and said sealing means, the periphery of said washer resting on the interior of said liner.

9. A live bait bucket, comprising:
   (a) a container for water formed with a bottom wall and a side wall, said bottom wall having an aeration aperture therein, said side wall having one end joined to said bottom wall and an opposite end with an outward extending lip defining the top of said container;
   (b) an insulated liner for said container, said liner fitting within said side wall and on top of said bottom wall, said liner having a top end and having a bottom end with an opening therein which is aligned with said aperture in said bottom wall; and
   (c) clip-on means, removably carried by the lip of said container, for holding said liner within said container.

10. The bucket of claim 9, wherein said clip-on means comprises a plurality of generally L-shaped clips.

11. The bucket of claim 10, further including:

(a) a base extension formed below said bottom wall and with said bottom wall forming a cavity;
(b) an air pump mounted in said cavity;
(c) a check valve;
(d) means for connecting the output of said air pump through said check valve and said aperture, whereby air pumped by said air pump is introduced into the water in said container through said check valve and said aperture, said check valve preventing the backflow of water from said container through said aperture into said air pump;
(e) a battery holder for holding at least one battery which supply energy to said pump; and
(f) an electric switch for control of the operation of the pump.

12. A live bait bucket, comprising:
(a) a container for water formed with a bottom wall and a side wall, said bottom wall having an aeration aperture therein, said side wall having one end joined to said bottom wall and an opposite end defining the top of said container;
(b) an insulated liner for said container, said liner fitting within said side wall and on top of said bottom wall, said liner having a top end and having a bottom end with an opening therein which is aligned with said aperture in said bottom wall; and
(c) aeration means, removably carried by said bottom wall of said container and passing through said aperture in said bottom wall and through said liner, for sealing the opening in said bottom wall and for holding said liner within said container.

13. The live bait bucket of claim 12, wherein said aeration means comprises:
(a) a base carried by said bottom wall at the exterior of said container;
(b) an electrically driven air pump, carried by said base, for pumping air from the exterior of said bottom wall through said aperture in said bottom wall and through said opening in said liner; and
(c) a power supply for said pump comprising at least one battery removably carried within a drawer which is carried by said base so as to be movable from a closed position wherein the interior of said drawer is disposed between said bottom wall and said base and an open position wherein the interior of said drawer is exposed.

14. The live bait bucket of claim 13, wherein said liner comprises a side wall and a bottom wall integrally connected to said bottom wall, said bottom wall of said liner haivng said opening therein.

15. The live bait bucket of claim 14, wherein said aeration means further includes:
(d) a pump support member on said base, said air pump being mounted on said pump support member;
(e) a check valve; and
(f) an air passageway having first and second ends formed in said pump support member, said first end of said air passageway receiving the output of said air pump, said second end of said air passageway delivering said output through said check valve and aperture to the water in said container, whereby air pumped by said air pump is introduced into the water in said container through said check valve and aperture, said check valve preventing the backflow of water from said container through said aperture and into said air pump.

16. The live bait bucket of claim 15, wherein said second end of said air passageway is adjacent said bottom wall and wherein said check valve has an inlet portion, said check valve being located in said container with at least its inlet portion extending through said aperture and being connected to the second end of said air passageway.

17. The live bait bucket of claim 15, wherein said check valve has an inlet portion, a main body portion and an outlet portion, said main body portion and said output portion being located in said container and said inlet portion extending through said aperture and being connected to said second end of said air passageway.

18. The live bait bucket of claim 17, wherein said inlet portion of said check valve and said second end of said air passageway are provided with threads which engage each other to secure said check valve to said air passageway.

19. The live bait bucket of claim 17, wherein a sealing member is provided between said bottom wall and said check valve to provide a water tight connection therebetween.

20. The live bait bucket of claim 19, wherein said sealing member is an O-ring which surrounds said inlet portion adjacent said main body portion of said check valve.

* * * * *

UNITED STATES PATENT AND TRADEMARK OFFICE
CERTIFICATE OF CORRECTION

PATENT NO. : 4,757,636

DATED : July 19, 1988

INVENTOR(S) : Robert G. Lambourn

It is certified that error appears in the above-identified patent and that said Letters Patent are hereby corrected as shown below:

Column 1, line 66, "sealaing" should be -- sealing --.
Column 2, line 27, "elevation" should be -- elevational --.
Column 3, line 14, "appratus" should be -- apparatus --.
Column 3, line 33, "aperature" should be -- aperture --.
Column 4, line 22, "cricular" should be -- circular --.
Column 4, line 26, "is" should be -- it --.
Column 4, line 29, delete "now".
Column 5, claim 1, line 44, "bototm" should be -- bottom --.

Column 6, claim 8, line 33, after " b)" insert -- a -- and delete "checking" and substitute -- check --.
Column 6, claim 8, line 40, "chcek" should be -- check --.
Column 8, claim 14, line 4, "haivng" should be -- having --.

Signed and Sealed this

Twenty-ninth Day of November, 1988

Attest:

DONALD J. QUIGG

Attesting Officer

Commissioner of Patents and Trademarks